United States Patent [19]
Koehler

[11] 3,859,623
[45] Jan. 7, 1975

[54] EMERGENCY SIGNAL WARNING SYSTEM
[75] Inventor: Lyle E. Koehler, New Brighton, Minn.
[73] Assignee: Ronald Jerome Goldman, St. Paul, Minn.
[22] Filed: Jan. 10, 1973
[21] Appl. No.: 322,281

[52] U.S. Cl. ............................................... 340/34
[51] Int. Cl. ............................................ G08g 1/00
[58] Field of Search .......... 340/32, 33, 34; 329/122; 331/23, 25; 325/346, 419

[56] References Cited
UNITED STATES PATENTS

| | | | |
|---|---|---|---|
| 3,014,199 | 12/1961 | Dill et al. .............................. | 340/34 |
| 3,182,288 | 5/1965 | Smith.................................... | 340/34 |
| 3,412,378 | 11/1968 | Thomas ................................ | 340/34 |
| 3,430,195 | 2/1969 | Castlen ................................. | 340/34 |
| 3,568,144 | 3/1971 | Streb.................................... | 340/34 |
| 3,626,311 | 12/1971 | Kraybill ............................... | 329/122 |
| 3,626,365 | 12/1971 | Press et al............................. | 340/34 |
| 3,735,342 | 5/1973 | Helliker et al. ....................... | 340/34 |
| 3,737,792 | 6/1973 | Parham................................. | 329/122 |

Primary Examiner—Kathleen H. Claffy
Assistant Examiner—Randall P. Myers
Attorney, Agent, or Firm—Jacobson & Jacobson

[57] ABSTRACT

An electronic system suitably arranged in a compact fashion for easy installation in a vehicle such as an automobile, picks up audio frequency signals, separates the signal generated by an emergency siren and produces a warning signal to the occupants of the vehicle so appropriate action can be taken by the driver when an emergency is nearby.

2 Claims, 2 Drawing Figures

PATENTED JAN 7 1975 3,859,623

EMERGENCY SIGNAL WARNING SYSTEM

BACKGROUND OF THE INVENTION

Field of the Invention. This invention is directed for use in vehicles and primarily in automobiles so that when the automobile is being operated with the windows closed or where there is a large amount of ambient noise, a siren from an emergency signaling device will be detected and a signal be given to the automobile driver so that he can take whatever action is necessary. This may mean that the driver will have to take some evasive action to avoid the cause for the emergency siren signal. It is not uncommon that the driver of an automobile fails to hear the siren from an emergency vehicle until the vehicle is very close at hand. This happens when driving in heavy, noisy traffic, for example, or when driving in the wintertime with the windows rolled up and the heater going, or in the summertime with the windows rolled up and the air conditioner or any time when there are people talking in the automobile or a radio or a stereotape is being played. Failure to hear an emergency vehicle siren and to respond promptly thereto not only may impair the travel of the emergency vehicle but could also result in a collison between the emergency vehicle and other vehicles. There may be other instances of emergency sirens not being heard inside a vehicle. In the interest of safety, therefore, it is very important that a warning device of this nature be provided for the vast number of automobiles that are in present day use.

Description of the Prior Art. One drawback of prior art devices designed to perform the same function as the instant invention is the failure to adequately discriminate or differentiate between the emergency siren and other ambient audible frequency noises. Another drawback has been the difficulty in providing a compact apparatus which can be installed in a vehicle so that it does not take up a great deal of room nor hinder the comfort of the occupants of the vehicle and yet be able to operate satisfactorily under the environmental conditions and when subjected to the physical abuse that is normally encountered in the operation of a vehicle such as an automobile.

SUMMARY OF THE INVENTION

A device is provided which first will distinguish the signal from an emergency siren which varies between two different audio frequencies at a predetermined rate from that of other audio signals and will then produce a signal in response thereto to warn the occupants of a vehicle of the proximity of the source of the emergency signal. A transducer such as a microphone, picks up the audio signals and feeds them into an amplifier which filters or blocks out signals of frequencies outside of the range determined by the two levels between which the siren varies. The output from the amplifier is then fed to an electronic phase-locked-loop circuit which produces an output voltage which shifts between two levels as the incoming signal varies between the two predetermined audio signal frequencies of the siren. The output of the phase-locked-loop circuit is fed to a bandpass amplifier which amplifies the shifting output only if it occurs at about the predetermined rate. If this does occur, then the amplified output will exceed a preset threshold level and turn on a transistor which will then energize an indicator lamp. In this fashion then, in order to produce a warning signal, there has to be detected not only an audio signal that is within a prescribed frequency range but also one which varies between two frequency levels at a predetermined rate. This then provides the degree of discrimination which is necessary in order to provide the vehicle driver with a reliable indication of the occurrence of an emergency siren signal. In addition, the circuits involved, in particular the phase-locked-loop circuit, are integrated circuits so that they are very compact, take up little room and are quite rugged.

DESCRIPTION OF THE PREFERRED EMBODIMENTS

To begin with, this invention is directed for use with a signal emanating from the siren of an emergency vehicle or the like which varies between two audio frequencies, which hereinafter are referred to as F1 and F2, at a predetermined rate, F2. Sirens of this nature have become quite commonplace and are preferred over the single frequency siren signal which had been in popular use in the past. For illustration purposes, and no limitation thereto being intended, assume that F1 is 700 hz., F2 is 950 hz. and F3 is 50 times per minute. The only limitation is that naturally the tone of the siren signal must be in the audio range. Suitable frequencies are ordinarily selected by those who design sirens for most effective and greatest range. It should be kept in mind that the invention can also be used to detect other emergency signals such as those emanating from a train approaching a crossing or from an open drawbridge or the like.

Figure 1:
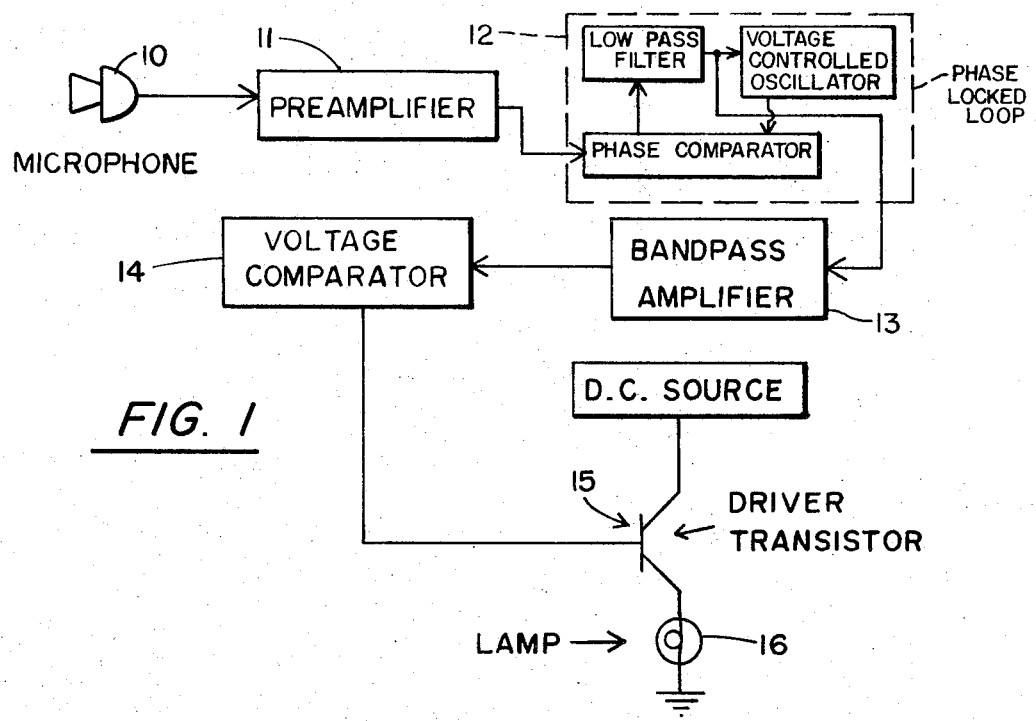
FIG. 1 is a block diagram of the preferred embodiment of the invention.

FIG. 1 illustrates in block diagram form the various functional sections of the circuit of the invention. A microphone 10 suitably mounted to the vehicle where it will pick up all of the sounds outside the vehicle. In the usual fashion the microphone converts these sounds to electrical signals of corresponding frequencies and these are fed into a preamplifier 11. The preamplifier is tuned to pass a band of frequencies ranging from about 700 hz. to about 950 hz. Signals of frequencies outside that range will be greatly attenuated and only the signals within that range will be substantially amplified. In substance the preamplifier filters out the noise signals received by the microphone except for those falling within the frequency range of F1 to F2.

The output of preamplfier 11 is fed into the phase-locked-loop circuit 12. The latter, which will be described in somewhat greater detail later, produces a voltage output which varies in accordance with the change of frequency of the incoming signal. In other words, each time the frequency of the signal input to the phase-locked-loop circuit changes, there is a change in the output signal level. The rate at which the frequency of the input signal changes will determine the rate at which the output signal varies. The output from the phase-locked-loop circuit 12 is fed as an input to band-pass amplifier 13 which is quite sharply tuned to FIG. 3 which in the instant example is 50 times per minute. Band-pass amplifier 13 will then take the signal output from the phase-locked-loop circuit 12, which varies at a rate of F3, and amplify only that which changes at about the F3 rate to produce an amplified output signal which is then fed to voltage comparator 14. If the amplitude of the output from band-pass amplifier 13 is of a sufficient magnitude, then the voltage comparator produces an output which turns on a driver transistor 15 causing it to energize lamp 16 to produce a visual signal warning of the siren from the emergency vehicle.

Figure 2:
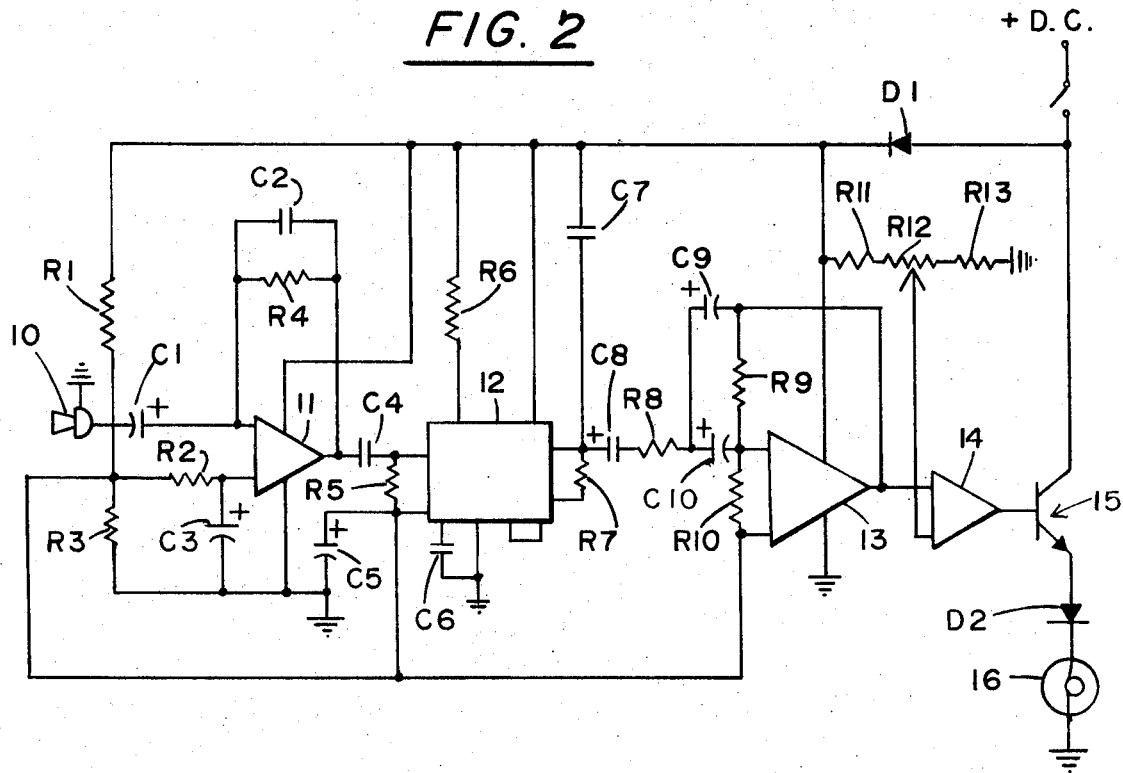
FIG. 2 is a somewhat more detailed schematic diagram of the circuit shown in FIG. 1.

Turning now to FIG. 2, the circuitry of the invention is shown in somewhat more detailed schematic form. The output from microphone 10 is fed into preamplifier 11 which in turn feeds the phase-locked loop circuit 12 which has its output fed to the input of band-pass amplifier 13 which feeds voltage comparator 14 which controls the turning on of lamp 16 through transistor 15. The two amplifiers 11 and 13 and the voltage comparator 14 are shown in their commonly accepted configuration of a triangle with the base of the triangle representing the input and the apex of the triangle representing the output. The circuits for each of the individual sections are well known and are a matter of choice to be selected or designed by one of ordinary skill and therefore are not shown nor described in detail except as to the phase-locked-loop circuit 12. Preamplifier 11 can be of any suitable design to perform the function, as described earlier, of amplifying only those signals within the limits of the range set by F1 and F2. Similarly with respect to the design or choice of band-pass amplifier 13 which must amplify only the signal inputs that are at the frequency of about F3. The voltage comparator 14 which produces the signal to turn on transistor 15 also is of a standard design readily designed or selected by one having ordinary skill with circuits of this nature.

Because of its importance to the function of the apparatus, it is felt that some detail of the operation of phase-locked-loop circuit 12 is in order. However, this circuit also has become quite standard and is well known by circuit designers. The specific component values and specific arrangements are determined by the specific type of application to which the circuit is put and the signal frequencies at which it is intended to be used and operated. The phase-locked-loop circuit basically is a feedback system comprised of a phase-comparator, a low pass filter and a voltage controlled oscillator. The voltage controlled oscillator is initially set to operate at a given frequency at no input signal. When an input signal appears, the frequency of the signal from the oscillator is compared to the frequency of the input signal and an error voltage is generated that is related to the phase and frequency differences between the two compared signals. This error voltage is filtered through the low pass filter and applied to the voltage controlled oscillator to change its frequency to that of the input signal. The error signal is also the signal which is then fed from the phase-locked-loop circuit 12 to the band-pass amplifier 13. If, for example, the voltage controlled oscillator is set to run at a frequency of about 800 hz. and the incoming signal is at a frequency of about 700 hz., an error voltage is produced and fed to the oscillator to change its frequency to 700 hz. If the frequency of the input signal then shifts, another error signal is developed and fed to the oscillator to change its frequency to the new frequency. As the incoming signal changes in frequency, a corresponding error voltage will be generated to keep the voltage controlled oscillator "locked" onto the incoming signal. If this occurs at the predetermined rate of F3, the visual warning signal to the driver of the vehicle will then be produced in the manner described earlier. Changes in the frequency of the incoming signal other than those attributable to the siren signal, will produce error voltages which will appear at the output of the phase-locked-loop circuit but will not be at the rate that is necessary in order to produce a resulting amplified output signal from the band-pass amplifier 13. This means then that the warning signal will not respond to anything but the siren signal which changes between the two prescribed frequency levels at the prescribed rate.

Phase-locked-loop circuits have been known for a number of years. Because of their cost and size due to their relative complexity, their use has been limited. However, they have now been made using integrated circuit techniques so that their cost and size have been sharply reduced. Also, because of the integrated circuit construction, they are much less susceptible to damage caused by mishandling or by environmental conditions. It is interesting to note that the entire circuit of the invention could be constructed by coupling together the individual sections which are integrated circuits or from a single integrated circuit package containing all of the circuits and the coupling circuits to make a very compact unit which can be installed in a vehicle in almost any location and does not interfere with the comfort of the driver or the passengers.

In the circuit diagram of FIG. 2, the combination of resistor R6 and capacitor C6 determine the frequency of the oscillator signal when no input is received in the phase-locked-loop circuit 12. The combination of resistor R7 and capacitor C7 determine how far the incoming signal can differ from the signal of the voltage controlled oscillator and still be locked on by the operation of the phase-locked-loop circuit.

In other areas of the circuit of FIG. 2, diode D1 performs no particular function except to protect the other circuit components in the event the DC voltage should be reversed in polarity. Diode D2 prevents transistor Q1 from drawing current constantly. Potentiometer R12 is used to set the threshold level at which the transistor will be energized by the voltage comparator 14. Resistors R11 and R13 limit the amount of the threshold adjustment range. The other components shown in FIG. 2 are for their usual purposes of filtering and coupling from one circuit to another and, of course, their values are a matter of choice and design depending upon the frequencies of the signals and other factors. Typically, for a circuit which has been constructed and operated satisfactorily in the manner as described, the values for the respective components illustrated in FIG. 2 are:

| | | | |
|---|---|---|---|
| R1, R3, R6, R11 | 3.3K | R12 | 2K |
| R2, R4 | 100K | C1 | 2.7 microfarads |
| R5 | 1K | C2 | .001 microfarads |
| R7 | 2.4K | C3 | 5 microfarads |
| R8 | 12K | C4 | .47 microfarads |
| R9 | 150K | C5 | 25 microfarads |
| R10 | 680 | C6, C7 | .1 microfarads |
| | | C8 | 47 microfarads |
| | | C9, C10 | 10 microfarads |

I claim:

1. Apparatus for giving a warning indication of a siren which produces an audio frequency signal which changes in frequency between F1 hz. and F2 hz. at the rate of about F3 times per minute comprising, in combination:
  a. a transducer for picking up the siren signal and changing it to electrical signals;
  b. amplification means tuned to amplify signals from said transducer which are within the F1 to F2 frequency range;
  c. a phase-locked-loop circuit consisting of electrical circuit means for producing electrical signal oscillations within the frequency range of F1 to F2 and additional electrical circuit means for comparing the signal from said amplification means to the signal produced by said oscillation means and for producing an error signal to change the frequency of the latter to substantial agreement with the former;
  d. band-pass amplification means coupled to said additional electrical circuit means for producing an electrical signal output of a predetermined level only when the frequency of the said error signal is about F3; and
  e. means coupled to the output of said band-pass amplification means for producing a warning signal when the output is at least said predetermined level.

2. The invention as set forth in claim 1 wherein the phase-locked-loop circuit is an integrated circuit.

* * * * *